INVENTOR
CHARLES J. GIBBS
BY
ATTORNEYS

Dec. 10, 1957  C. J. GIBBS  2,815,771
PIPELINE BLIND DEVICE
Filed Oct. 4, 1954  3 Sheets-Sheet 3

INVENTOR
CHARLES J. GIBBS
BY
ATTORNEYS

United States Patent Office 2,815,771
Patented Dec. 10, 1957

2,815,771

PIPELINE BLIND DEVICE

Charles J. Gibbs, Orinda, Calif., assignor, by mesne assignments, to California Research Corporation, San Francisco, Calif., a corporation of Delaware Application October 4, 1954, Serial No. 460,109

5 Claims. (Cl. 138—94.3)

This invention relates to a pipeline flow control device, commonly known as a line blind fitting, and more particularly, to a self-contained, expandable line blind fitting having annular sealing rings which may be forced apart with respect to each other and into engagement with the faces of a pair of stationary and adjacently opposed flanges.

It is often necessary in pipeline installations, for example in oil refineries, to restrict fluid flow through a pipeline by means of a fluid flow-impeding member placed in the fluid stream. It is also often necessary in such installations to compartmentalize a section of pipeline for cleaning and other purposes, without emptying or otherwise disturbing contiguous sections of the same pipeline. Fittings that are commonly used in connection with valves to perform one or both of these functions are known as line blind fittings.

The various line blind fittings to restrict, or stop, fluid flow in pipelines that heretofore have been known, generally comprise telescoping sections which, during operation of the fitting, clamp a flow control plate against a fixed shoulder in the fittings. Such fittings are bulky in the longitudinal or axial direction of the pipeline, and because of their bulk are unwieldy to handle and difficult to manufacture cheaply. Such fittings are connected generally as inserts between opposed sections of pipeline in such a way that relative movement between the opposed sections of pipeline is required for their operation, with the attendant danger of disturbances in adjacent portions of the pipeline structure. Furthermore, the usual line blind fitting cannot be adjusted in one operation, such as by turning one handle or tightening one clamp but, rather, requires for its adjustment the manipulation of several independent clamps, bolts, or other adjusting means, thus complicating the placement and release of the flow-impeding members. Each of the few line blind fittings which do have a single operating member and which do not require for their efficacy a relative movement between the opposed pipe sections between which they are inserted, generally includes the bulky construction referred to above. The few line blind fittings which are compact in the longitudinal direction of the pipeline generally have achieved their compactness without retaining the desirable features of simple operating means and usability without necessity for relative movement between the opposed sections of the pipeline in which they are inserted.

An object of this invention is to provide a line blind construction in which the members upon which the sealing rings are mounted actively receive the operating force applied to the line blind and transmit it to the sealing rings, rather than such members serving as mere supports for the sealing rings and being clamped between other members during blind operation, as in previously known line blinds. The particular advantage of said construction is that the entire unit may be readily repaired, if the operating elements become worn during service, by replacement and removal to a central repair shop rather than requiring field maintenance and repair.

This invention comprehends, broadly, a compact pipeline blind fitting conveniently installable in a minimum amount of space between two flanged, opposed pipeline sections, without modification of said sections or the flanges, said fitting comprising two members, on each of which is mounted a sealing ring, which members can be forced apart to bring the sealing rings into contact with the pipeline sections, a blind plate portion for complete fluid flow stoppage, and an open plate portion for unrestricted fluid flow operation, said blind plate and open plate portions being readily and interchangeably insertable between opposed pipeline sections, and the efficient operation of which blind fitting requires no relative movement between opposed pipeline sections between which the blind fitting is inserted. Accordingly, another object of the invention is to provide a device in which the foregoing advantages coexist. Said construction permits a greater flexibility in the design of a pipeline system requiring blinding operations by permitting the installation of a relatively thin spacer between any flanged section of said pipeline which may be readily replaced by devices constructed in accordance with the present invention.

These and other objects and advantages of this invention will be further apparent from the following detailed description of preferred forms and modifications of the invention throughout which description reference is made to the accompanying drawings, in which.

Figure 1:
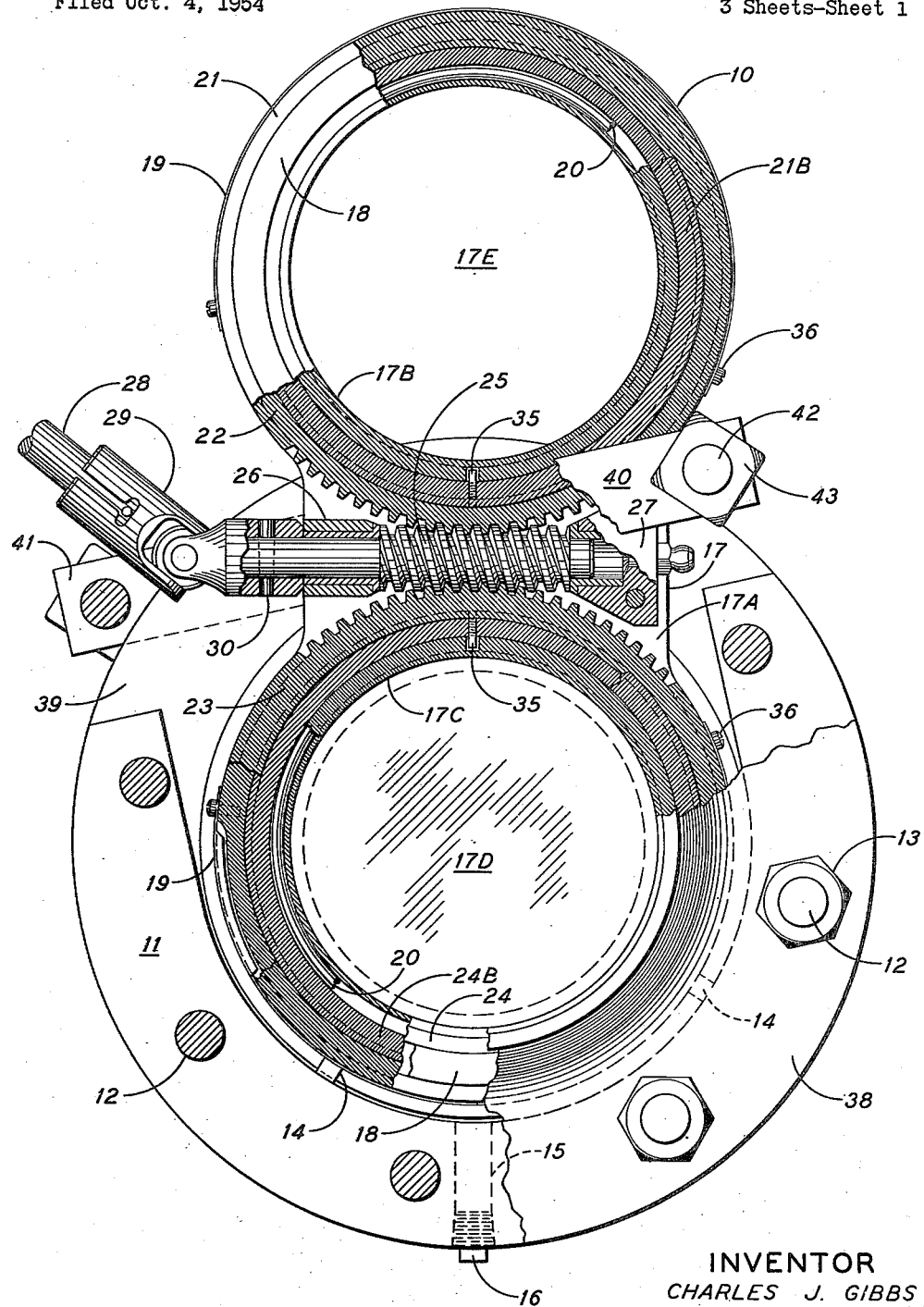
Fig. 1 is an end view of a pipeline fitting embodying the advantages provided by the present invention in which certain portions are shown cut away to reveal the inner operating and construction details.

The preferred embodiment of the expandable pipeline blind fitting 10, illustrated in Figs. 1 and 2, may be said to include, or to act in conjunction with, a horseshoe-shaped spacer 11, which serves as a cup member, as explained hereinafter. As shown, spacer 11 is inserted between opposed, flanged pipeline sections, designated as flanges 38 and 39 in Fig. 2, and is secured therebetween by means of stud bolts 12 and nuts 13 in such a way as to act as a cradle to receive the line blind assembly 10. Metal centering or spacer blocks 14 are welded to spacer 11 in such positions that, after the main blind assembly is inserted in spacer 11, the movable or expandable portions thereof will operate clear of spacer 11, and so that the blind section or open section, as the case may be, will be centered in the path of fluid flow in the pipeline. With further reference to the construction of spacer 11, it will be particularly noted that the ends of the horseshoe-like structure are made of sufficient length so that the fluid in the pipeline will not spill out if there is zero pressure on the line when the blind assembly is removed. Thus, it will be seen that spacer 11 also acts as a cup to prevent loss of product from the line. A drain outlet 15 is provided in spacer 11, through which fluid may be drained by removal of plug 16.

The expandable line blind assembly proper includes a stationary assembly designated as 17, which comprises a main backing plate portion 17A and two identical annular ring portions 17B and 17C, respectively, welded thereto. It will be understood that rings 17B and 17C may be formed as an integral part with plate 17A by forging or casting, if desired. Main backing plate portion 17A is in the general shape of a plane figure eight, one loop of which includes imperforate blind plate portion 17D concentric with ring portion 17C, and the other loop of which includes opening 17E forming an orifice concentric with the annular ring portion 17B. Annular ring portions 17B and 17C are substantially identical so that they are coplanar, have smooth bores, and each is adapted to slidably engage a movable flange portion 21B and 24B, respectively. To assure against fluid leakage between the oppositely movable or expandable ring members 17C and 24B, as well as 17B and 21B, each of the annular ring portions 17B and 17C has an external annular groove for the reception of an annular seal, such as O-rings 20. To prevent fluid leakage between the pipeline flanges, 38 or 39, and the main backing plate portion 17A, two annular grooves, one in each loop of the figure eight, are formed for the reception of a pipeline flange-engaging seal 18.

Movable assembly 21, which, as mentioned above, is adapted to expand with respect to stationary assembly 17 and in the axial direction of the pipeline, comprises a backing plate portion 21A having a flange portion 21B welded thereto, which alternatively may be made as an integral part thereof. Flange portion 21B has a smooth bore adapted to slidably engage the outer periphery of annular ring portion 17B, while the external surface is provided with a helical, left-hand thread adapted to engage threadably the annular ring gear 22. A longitudinal or axial slot is formed in the outer surface of flange 17B through which a stop pin 35, secured to ring flange 21B, may move to prevent rotation of assembly 21 with ring gear 22. Backing plate portion 21A is desirably formed with an annular groove for the reception of a pipe-flange-engaging seal 18, simliar to that positioned in the grooves on backing plate 17A.

Movable assembly 24, as mentioned above, expands relative to stationary assembly 17 and is similar to assembly 21. Movable assembly 24 comprises a backing plate 24A with a flange 24B welded thereto, or alternatively made an integral part thereof. Flange portion 24B has a smooth bore adapted to engage slidably the outer surface of annular ring portion 17C. The external surface of flange 24B, as distinguished from flange 21B, is provided with a helical, right-hand thread adapted to engage threadably annular ring gear 23. A longitudinal slot is also formed in the outer surface of flange 17C, through which another stop pin 35, secured to ring flange 24B, may move to prevent rotation of assembly 24 with ring gear 23. Backing plate portion 24A has a similar annular ring groove for the reception of a flange-engaging seal 18.

For the purpose of moving either movable assembly 21 or movable assembly 24 relative to backing plate assembly 17, to bring the assembly into sealing engagement with the end faces of pipe flanges 38 and 39, a centrally disposed worm gear 25 adapted to engage threadably and simultaneously the annular ring gears 22 and 23, which respectively engage rings 21B and 24B of the movable assemblies 21 and 24. As particularly shown in Fig. 2, the rotatable rings 22 and 23 made with the rings 21B and 24B by helically threaded connections so that when the rings 22 and 23 are rotated by the worm 25, both movable assemblies 21 and 24 may be laterally expanded or retracted with respect to the main backing plate assembly 17, thereby bringing the oppositely facing sealing rings 18 into firm and liquid sealing engagement with the end faces of pipe flanges 38 and 39. For the purpose of preventing the accidental disassembly of the rings 22 and 23 from their cooperative relationship with the backing assembly 17, a pair of semi-annular retainer springs 19 are fitted into the semi-annular grooves formed in both the top and bottom of assembly 17, in the manner shown in Fig. 2, as well as into the annular grooves in rings 22 and 23.

Figure 2:
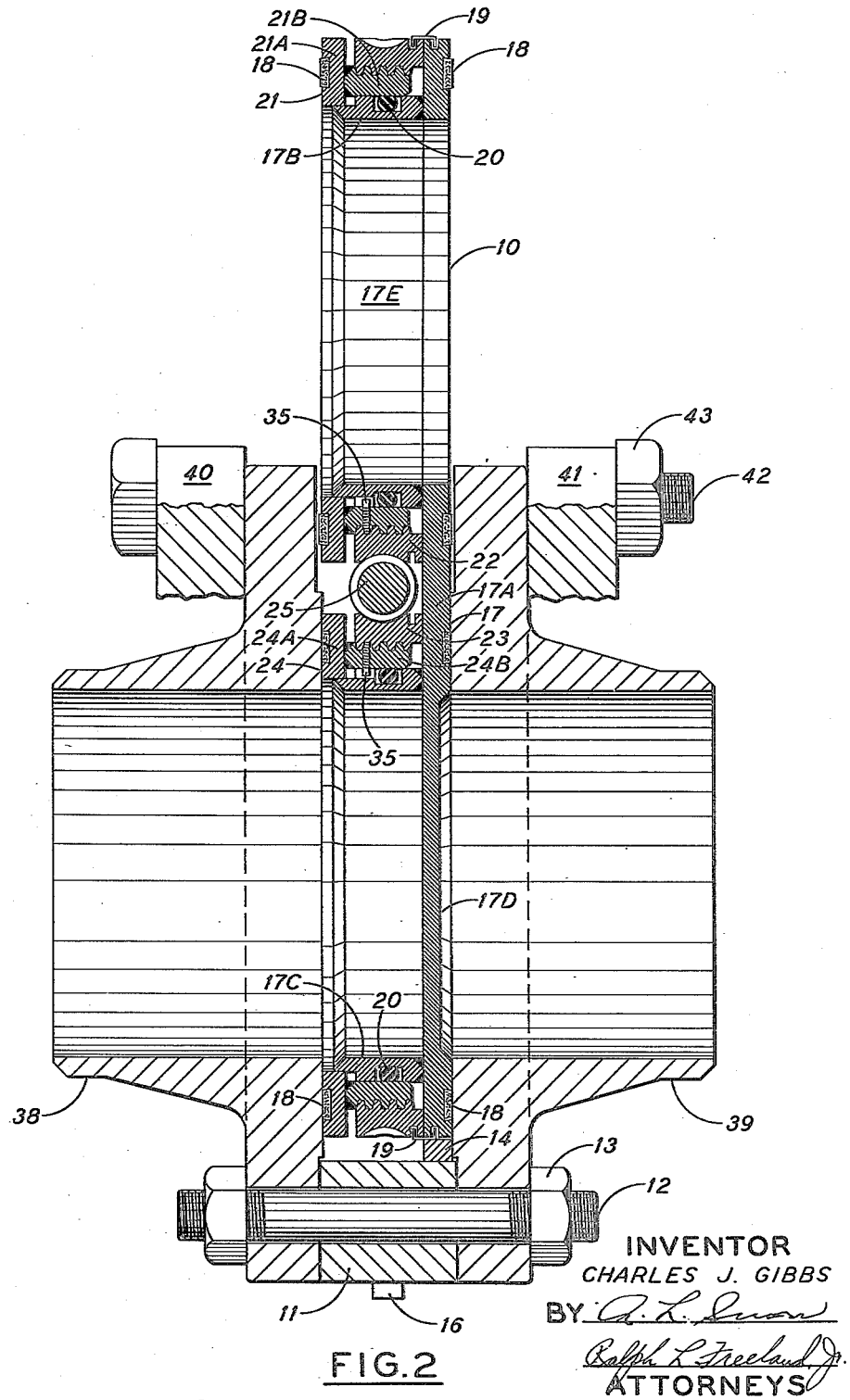
Fig. 2 is a sectional side elevation view taken through substantially the center of the view shown in Fig. 1.

As more fully shown in Fig. 1, the operation of the driving means for moving assemblies 21 and 24 relative to the main backing plate and within the space provided by the rigidly clamped ends of the pipeline, the shaft of worm 25 is mounted in a pair of bearings 26 and 27 which are supported by the central portion of the backing plate assembly 17. One end of the worm 25 terminates as a shaft portion, which may be conveniently connected to a universal joint 29 by pin 30 so that worm 25 may be conveniently driven by either a motor-operated shaft or hand-turned wrench shaft, one end of which is identified as 28.

Figure 3:
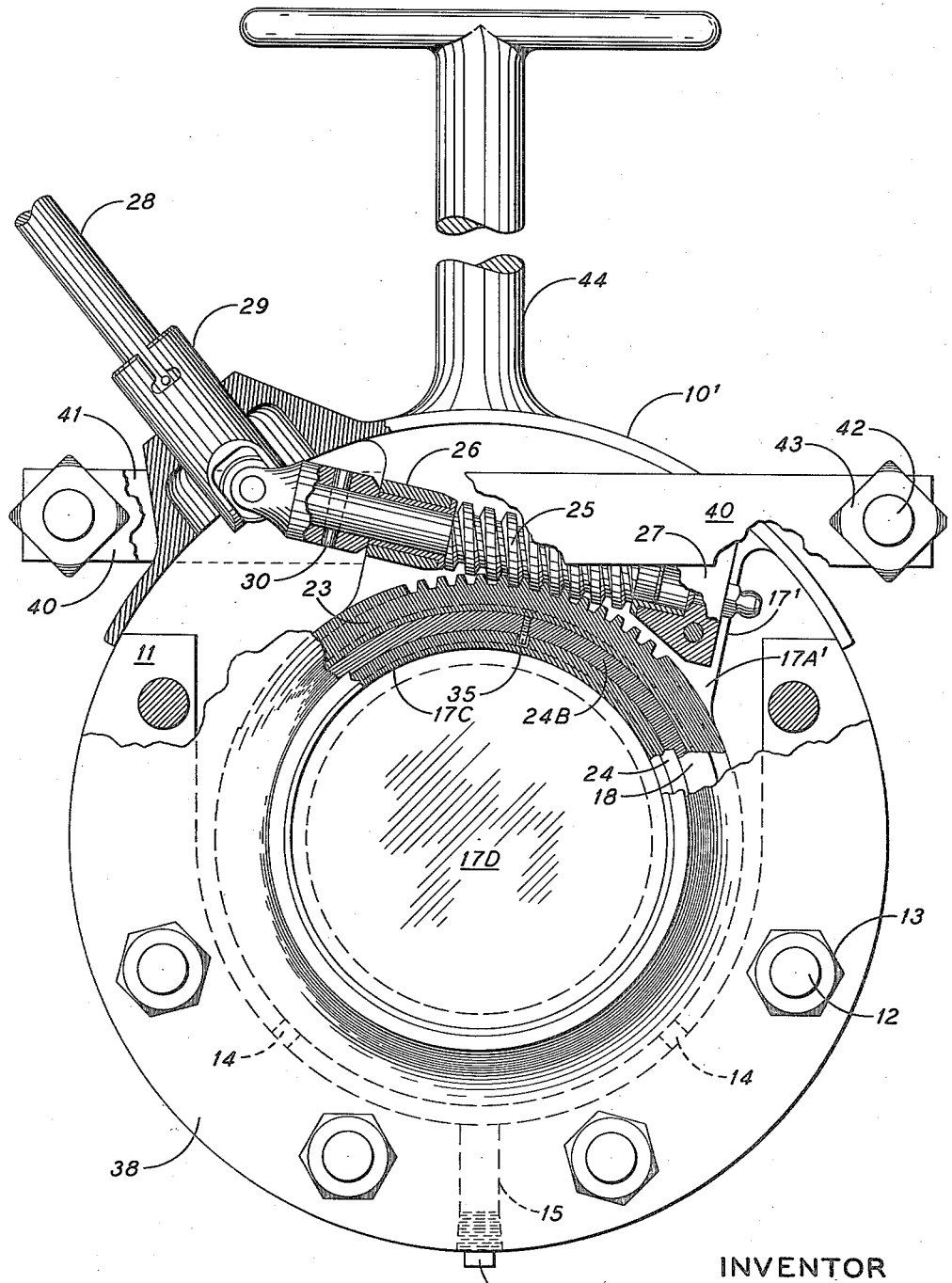
Fig. 3 is an end view similar to Fig. 1 of another embodiment of the invention which includes only a line blind plate, but which may be constructed to include an orifice or open plate.

Fig. 3 illustrates a modification of the present invention in which all the elements of the "figure eight" assembly 10 that are inactive when the opposite end of the "figure eight" assembly is inserted in a pipeline have been omitted, and in which a combined handle and cap member 44 has been added. This modification of the device may be constructed with either an imperforate plate blind 17D, as shown, to entirely impede the flow of liquid in a pipeline, or with an open plate. The handle portion of member 44 may be utilized as a visual indicator by disposing the handle either axially or transverse to the pipeline axis. For example, the handle for a blind element may be transverse while the open plate handle may be parallel to the pipeline.

It will be apparent that in the embodiments described, very substantial mechanical advantages obtain in the transmission of forces from the operator to the oppositely directed sealing rings 18 through the inherent expanding nature of the two embodiments of the invention. It will also be apparent that when it is desired to reverse or replace one of the flow control devices in a pipeline, it is a very simple operation to release the assembly without disturbance of either the strongbacks 40 and 41 or horseshoe-shaped cradle 11 to withdraw the device from the pipeline.

From the foregoing description, it will be obvious that the described embodiments are compact mechanisms that may be operated by a single operating means to stop or impede the flow of liquid in a pipeline without causing relative movement between the pipeline sections in which the mechanism is located. It will also be obvious that the described embodiments may be readily removed from a pipeline for reversing or replacement purposes with a minimum of tools and effort.

Although specific arrangements and modes of construction have been described and illustrated, it is obvious that numerous changes could be made in the apparatus and materials disclosed herein without departing from the substance of the invention, and all such changes which fall within the scope of the appended claims are intended to be embraced thereby.

I claim:

1. In an expandable assembly adapted to be removably placed between fixed pipe flanges and having a pair of outwardly facing parallel ring members secured against relative rotation and each provided with a face-sealing ring, means for selectively expanding and contracting said assembly comprising an externally threaded ring secured to the first of said member, a guide sleeve secured to the second of said members and axially aligning said members, an internally threaded ring gear engaging said threaded ring and rotatably connected to the second of said members, sealing means between the inner face of said externally threaded ring and said guide sleeve, and means supported solely by said second member for rotating said ring gear.

2. An expandable pipe fitting according to claim 1, in which one of said members comprises an imperforate disk.

3. In an expandable pipe fitting according to claim 1, said last-named means comprising a worm gear engaging the teeth of said ring gear.

4. An expandable assembly according to claim 1, with the addition of a second pair of parallel outwardly facing ring members substantially tangential to said first pair and coplanar therewith, the second of each pair of said members being secured together to form a unitary structure, one of said ring members comprising an imperforate disk.

5. An expandable assembly according to claim 4, in which said rotating means comprising a worm engaging both of said internally threaded ring gears, said last-named gears being threaded in opposite directions to expand and contract said assemblies simultaneously.

References Cited in the file of this patent

UNITED STATES PATENTS

| | | |
|---|---|---|
| 1,462,635 | Elder | July 24, 1923 |
| 1,753,723 | Seiffert | Apr. 8, 1930 |
| 2,558,247 | Hamer | June 26, 1951 |
| 2,664,918 | Hamer | Jan. 5, 1954 |